(12) United States Patent
Ma et al.

(10) Patent No.: US 8,070,859 B2
(45) Date of Patent: Dec. 6, 2011

(54) METHOD FOR PRODUCING A NON-POROUS MEMBRANE

(75) Inventors: Zidu Ma, Ellington, CT (US); Louis J. Spadaccini, Manchester, CT (US); He Huang, Glastonbury, CT (US); Harry Cordatos, Colchester, CT (US); Foster Phillip Lamm, South Windsor, CT (US); Ingo Pinnau, Palo Alto, CA (US)

(73) Assignee: Membrane Technology and Research, Inc., Menlo Park, CA (US)

(*) Notice: Subject to any disclaimer, the term of this patent is extended or adjusted under 35 U.S.C. 154(b) by 1720 days.

(21) Appl. No.: 10/786,707

(22) Filed: Feb. 25, 2004

(65) Prior Publication Data
US 2005/0184006 A1 Aug. 25, 2005

(51) Int. Cl.
*B01D 53/22* (2006.01)
*B01D 39/00* (2006.01)

(52) U.S. Cl. .... 96/6; 210/490; 210/500.27; 210/500.28; 210/321.6; 96/12; 95/45; 95/50; 95/54; 264/DIG. 48; 55/385.3

(58) Field of Classification Search ............... 210/490, 210/640, 500.27, 500.28, 321.6, 32.75; 95/45, 95/50, 54, 46, 55; 96/4, 10, 6, 9, 12, 175; 244/1 R; 55/385.3; 264/DIG. 48
See application file for complete search history.

(56) References Cited

U.S. PATENT DOCUMENTS

| 4,894,157 A | | 1/1990 | Johnson | |
|---|---|---|---|---|
| 4,963,165 A | * | 10/1990 | Blume et al. | 95/46 |
| 4,990,255 A | * | 2/1991 | Blume et al. | 210/500.27 |
| 5,049,167 A | * | 9/1991 | Castro et al. | 95/55 |
| 5,051,113 A | * | 9/1991 | Nemser | 95/54 |
| 5,051,114 A | | 9/1991 | Nemser | |
| 5,085,775 A | * | 2/1992 | Swamikannu | 210/500.27 |
| 5,116,650 A | * | 5/1992 | Bowser | 428/34.2 |
| 5,281,255 A | * | 1/1994 | Toy et al. | 95/50 |
| 5,649,517 A | * | 7/1997 | Poola et al. | 123/585 |
| 5,876,604 A | | 3/1999 | Nemser | |
| 5,902,747 A | | 5/1999 | Nemser et al. | |
| 6,112,908 A | * | 9/2000 | Michaels | 210/506 |
| 6,132,804 A | | 10/2000 | Rice | |
| 6,280,791 B1 | | 8/2001 | Meyerng | |
| 6,315,815 B1 | * | 11/2001 | Spadaccini et al. | 95/46 |

(Continued)

FOREIGN PATENT DOCUMENTS
EP 0 649 676 4/1995
(Continued)

OTHER PUBLICATIONS
European Search Report, Jun. 15, 2005.
(Continued)

*Primary Examiner* — Ana Fortuna
(74) *Attorney, Agent, or Firm* — Carlson, Gaskey & Olds, P.C.

(57) ABSTRACT

A non-porous membrane suitable for use in removing dissolved oxygen in a fuel deoxygenator device in an aircraft is produced by solvent casting. A first membrane layer is deposited on a substrate. A second membrane layer is deposited on top of the first membrane layer. Subsequent membrane layers may be deposited on top of the second membrane layer as desired. The resulting non-porous membrane allows little or no leaking of fuel across the membrane.

13 Claims, 3 Drawing Sheets

U.S. PATENT DOCUMENTS

| | | | |
|---|---|---|---|
| 6,351,583 B1 * | 2/2002 | Bergmann et al. | 385/24 |
| 6,544,316 B2 * | 4/2003 | Baker et al. | 95/55 |
| 6,592,650 B2 * | 7/2003 | Pinnau et al. | 95/47 |
| 6,592,679 B2 * | 7/2003 | Krolak | 134/21 |
| 6,709,492 B1 | 3/2004 | Spadaccini et al. | |
| 6,723,152 B2 * | 4/2004 | Bikson et al. | 95/45 |
| 6,896,717 B2 * | 5/2005 | Pinnau et al. | 95/51 |
| 6,923,846 B2 * | 8/2005 | Nelson et al. | 95/53 |
| 7,041,154 B2 * | 5/2006 | Staroselsky et al. | 95/30 |

FOREIGN PATENT DOCUMENTS

| | | |
|---|---|---|
| WO | WO 98/35739 | 8/1998 |
| WO | WO 02/11868 | 2/2002 |
| WO | WO 02/28714 | 4/2002 |

OTHER PUBLICATIONS

"On-Line Fuel Deoxygenation for Coke Suppression," L.J. Spadaccini and H. Huang, ASME, vol. 125, Jul. 2003, p. 686.

L. J. Spadaccini and H. Huang, Proceedings of Turbo Expo 2002, ASME Turbo Expo: Land, Seat & Air 2002, Jun. 3-6, 2002, Amsterdam, The Netherlands GT-2002-30071.

U.S. Appl. No. 10/407,004, filed Apr. 4, 2003.

* cited by examiner

METHOD FOR PRODUCING A NON-POROUS MEMBRANE

BACKGROUND OF THE INVENTION

This invention relates to a method for producing a non-porous polymer membrane and a fuel deoxygenator device that uses the non-porous polymer membrane to remove dissolved oxygen from fuel.

In a fuel system such as for an aircraft, fuel is mainly used to generate power. However, it also may be utilized as a coolant for various systems of the aircraft. Effective use of jet fuel as a coolant allows increases in operating temperatures of the aircraft and more efficient operation of the aircraft systems.

Jet fuel, like many other liquids, may absorb quantities of atmospheric gases. When jet fuel is in contact with air, oxygen from the air dissolves into the fuel. The absorbed gases may alter the chemistry of the fuel and affect the performance of the aircraft. For instance, the dissolved oxygen may react when heated above about 150° C. to form a free radical species. The free radical species initiate autoxidation reactions in the jet fuel that lead to the formation of carbonaceous deposits called "coke".

The presence of dissolved oxygen and coke deposits has several detrimental effects. First, the coke deposits may be carried through the fuel delivery system of the aircraft and hinder the functionality of various components in the system. Second, the presence of oxygen and formation of coke deposits limit the use of the jet fuel as a coolant. For instance, jet fuel with dissolved oxygen forms coke deposits above about 150° C., so the operating temperature of the aircraft system cooled by the jet fuel is limited to about 150° C. to minimize the formation of the coke deposits. On the other hand, if the jet fuel is deoxygenated, it may be heated to about 450° C. without forming significant coke deposits.

There is at least one existing method of gas separation that may be suitable for removing dissolved oxygen from the jet fuel; however, the existing membranes for use with this method are not suitable. The method involves transferring a gas between two fluids through a membrane filter. This known method has been used for separating a particular gas from a mixture of gases or separating a particular gas dissolved in an aqueous solution but has not been entirely successful for jet fuel because of insufficient quality of the membranes.

One device for removing dissolved oxygen uses a gas-permeable membrane disposed within the fuel system. As fuel passes along the permeable membrane, oxygen molecules dissolved in the fuel diffuse out of the fuel across the gas-permeable membrane. An oxygen partial pressure differential across the permeable membrane drives oxygen from the fuel, which is unaffected and passes over the membrane.

Conventional gas-permeable membranes used in the above devices are produced using known methods such as solution casting, melt casting, or other coating technique. The conventional membranes produced using these techniques have not yielded a membrane of sufficiently high quality for separation of oxygen in jet fuels though.

One of the primary detriments of conventional membranes is the effect of "micropores" in the membrane. Micropores are the free volume space between the molecules of the polymer that makes up the membrane. The free volume space forms a pathway, or micropore, through the membrane that enables molecules to permeate, i.e. migrate, from one side of the membrane to the other side of the membrane. In conventional membranes the size of the micropores is too large, allowing fuel, for example, to migrate into and infiltrate the membrane. As fuel infiltrates the membrane, the membrane becomes less effective in removing dissolved oxygen and incapable of sufficiently removing dissolved oxygen from the fuel.

Accordingly, a leak-free non-porous membrane is needed for removing dissolved oxygen from fuel.

SUMMARY OF THE INVENTION

In general terms, this invention is a method for producing a non-porous membrane and a fuel deoxygenator device that uses the non-porous membrane to remove dissolved oxygen from fuel.

In one example, a non-porous membrane according to the invention is used in a fuel deoxygenator device in an aircraft to remove dissolved oxygen from fuel. Removal of the dissolved oxygen makes the fuel more effective as a coolant for the aircraft systems and components.

In another example, a solution casting machine is used to apply a solution comprising an amorphous glassy perfluorodioxole copolymer and a fluorosolvent on a PVDF substrate. The solution is dried at a temperature between 130° C. and 150° C. for a time between 10 minutes and 30 minutes. This results in an amorphous glassy perfluorodioxole copolymer first membrane layer. A second amorphous glassy perfluorodioxole copolymer membrane layer is deposited on top of the first amorphous glassy perfluorodioxole copolymer membrane layer in a similar process. The result is a non-porous membrane that is suitable for removing dissolved oxygen from fuel.

In another example, a solution casting machine is used to deposit a first amorphous glassy perfluorodioxole copolymer membrane layer on a substrate. In forming a second amorphous glassy perfluorodioxole copolymer membrane layer, the solution casting machine deposits a solution comprising amorphous glassy perfluorodioxole copolymer and a fluorosolvent on top of the first amorphous glassy perfluorodioxole copolymer membrane layer. The solution partially dissolves a portion of the first amorphous glassy perfluorodioxole copolymer membrane layer before drying so that the first amorphous glassy perfluorodioxole copolymer membrane layer and second amorphous glassy perfluorodioxole copolymer membrane layer form a homogenous non-porous membrane after drying. The resulting homogenous non-porous membrane is suitable for removing dissolved oxygen from fuel.

The various features and advantages of this invention will become apparent to those skilled in the art from the following detailed description of the currently preferred embodiment. The drawings that accompany the detailed description can be briefly described as follows.

DETAILED DESCRIPTION OF THE PREFFERRED EMBODIMENT

Figure 1:
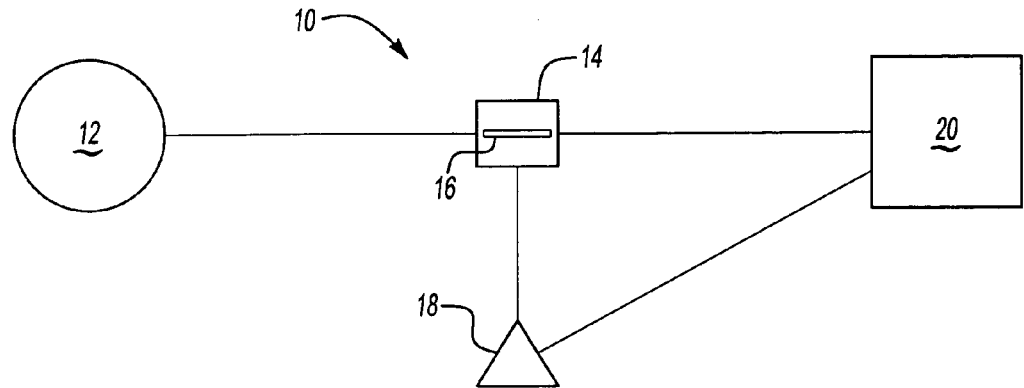
FIG. 1 is a general environmental view of a non-porous membrane in a fuel deoxygenator device in an aircraft.

FIG. 1 schematically illustrates a fuel system 10 of an aircraft, including a fuel storage tank 12 that is in fluid communication with a fuel separator, the fuel deoxygenator device 14. The fuel deoxygenator device 14 includes a membrane 16 to remove dissolved oxygen from the fuel, making the fuel more efficient for use as a coolant for various aircraft systems and components 18. Ultimately the fuel is used downstream from either the fuel deoxygenator device 14 or the aircraft systems and components 18 by the aircraft engine 20.

Figure 2:
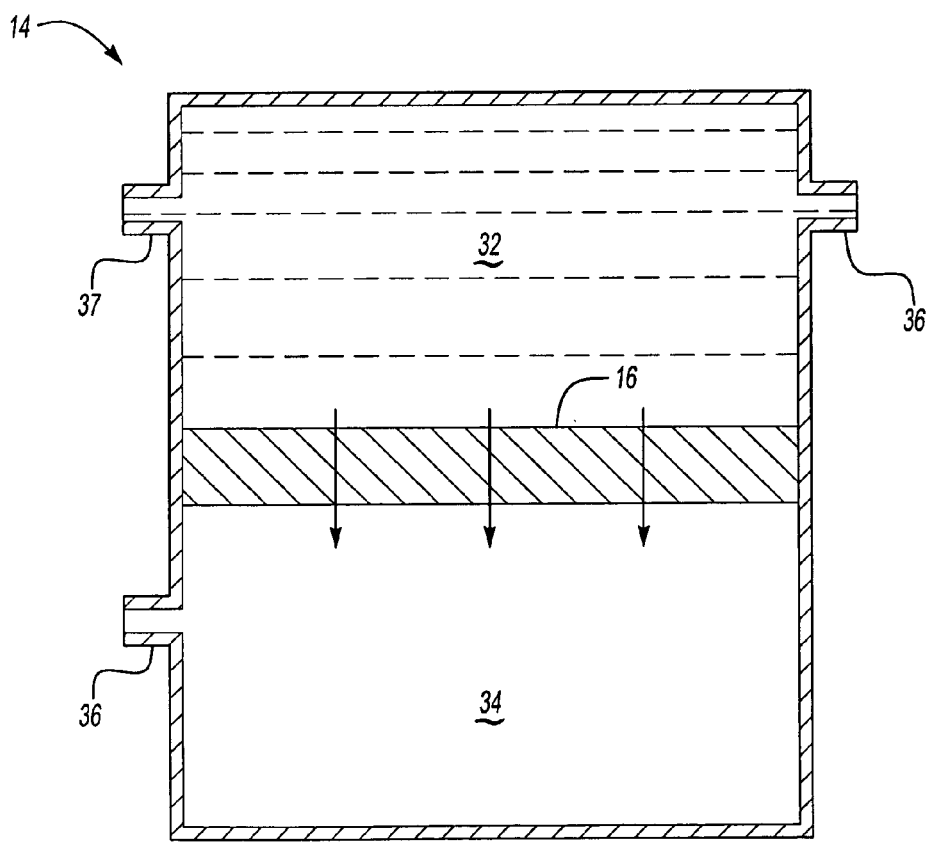
FIG. 2 is a schematic cross section of a fuel deoxygenator device.

Referring to FIG. 2, the fuel deoxygenator device 14 must effectively remove oxygen from the fuel in order for the fuel to be used effectively for cooling the various aircraft systems and components 18. The fuel deoxygenator device 14 includes a fuel side 32 and a non-fuel side 34. Fuel enters the fuel side 34 through the inlet 36 and contacts the membrane 16. The membrane 16 allows oxygen, for example, that is dissolved in the fuel to migrate to the non-fuel side 34 of the fuel deoxygenator 14, thus removing the oxygen from the fuel. To promote diffusion, an opening 36 is used to create an oxygen partial pressure differential between the fuel side 32 and non-fuel side 34. Generally oxygen-free fuel then leaves the fuel deoxygenator 14 through the outlet 37.

Figure 3:
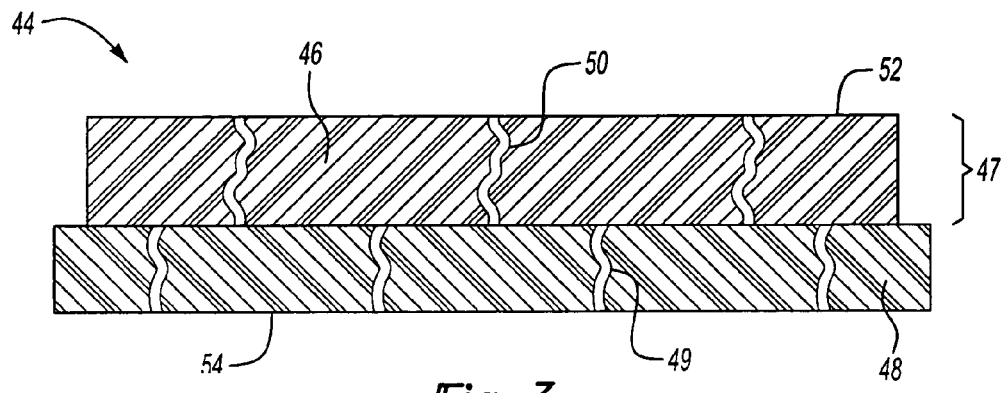
FIG. 3 is a cross section view of a prior art membrane.

A prior art membrane 44, such as that shown in FIG. 3, includes a single membrane layer 46, having a thickness 47, that is disposed on a plastic porous substrate 48 having pores 49 (shown larger than actual size to better illustrate the existence of pores 49). The single layer 46 is formed from a plastic material and includes micropores 50 (also shown larger than actual) that form pathways through the membrane that enable molecules to permeate, i.e. migrate, from the fuel side 52 of the membrane to the non-fuel 54 side of the membrane. The prior art membrane 44 allows fuel to leak through the micropores 50, making the prior art membrane 44 somewhat ineffective for removing dissolved oxygen in the deoxygenator device 14.

Figure 4:
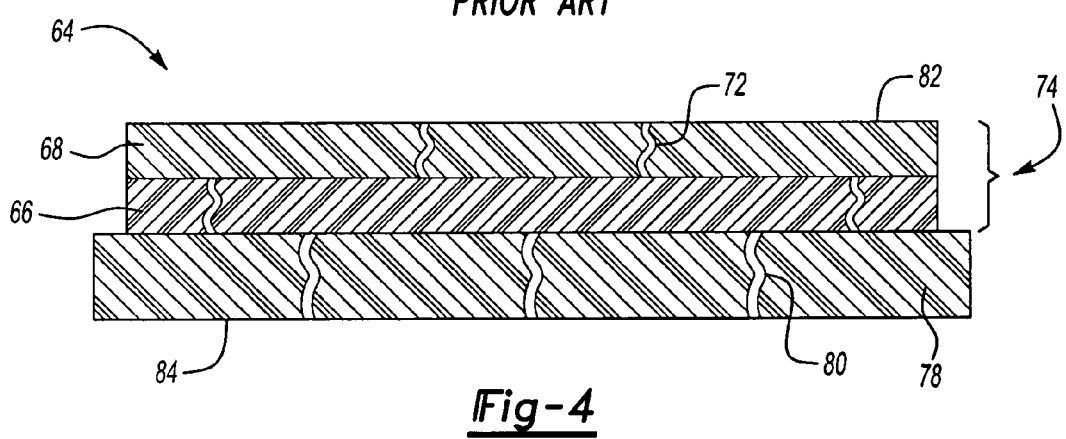
FIG. 4 is a schematic cross section of one example of a non-porous membrane produced according to the invention.

FIG. 4 shows one example of a non-porous membrane 64 according to the invention. The non-porous membrane 64 is comprised of a first membrane layer 66 and a second membrane layer 68 that both have micropores 72. Preferably the non-porous membrane has only a first membrane layer and second membrane layer; however, it should be understood that those of ordinary skill in the art who have the benefit of this disclosure would recognize the benefits of depositing additional membrane layers.

The first membrane layer 66 and second membrane layer 68 have a total thickness 74 (i.e. approximately the same as the thickness of the prior art membrane 44, but does not allow fuel to leak through the micropores). The non-porous membrane 64 is formed from a suitable plastic and is disposed on a suitable plastic porous substrate 78 having macropores 80. The micropores 72 that form pathways through the non-porous membrane 64 enable molecules to permeate from the fuel side 82 to the non-fuel 84 side.

The use of a first membrane layer 66 and second membrane layer 68, which are individually thinner than the example prior art membrane 44, enables the non-porous membrane 64 to be leak-free. The thinner layers produced according to the inventive method allow less leaking than a single thicker layer; however, thinner membranes are also much more susceptible to tearing and other mechanical damage. As a result, multiple thinner membrane layers can be disposed on a substrate 78, such as referred to in the example in FIG. 4, to achieve a leak free non-porous membrane that has an adequate thickness to resist tearing and other mechanical damage.

Figure 5:
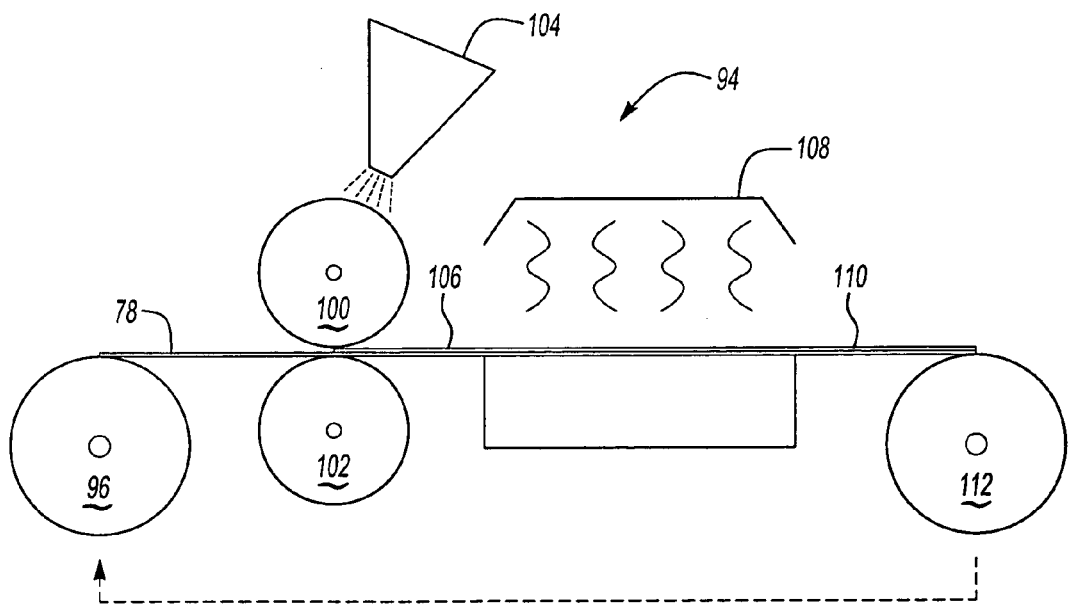
FIG. 5 is a schematic view of a solution casting machine.

FIG. 5 schematically illustrates one example of a coating process for making a non-porous membrane according to the invention. The known solution casting machine 94 includes a feed roll 96 at one end. The feed roll 96 carries a rolled sheet of substrate 78. The substrate 78 is fed between an upper roller 100 and lower roller 102. A solution feeder 104 delivers a solution to the upper roller 100. The solution includes a polymer dissolved in a solvent. The upper roller 100 deposits the solution onto the substrate 78 as it is fed between the upper roller 100 and lower roller 102. Once coated by the upper roller 100, the substrate with solution 106 travels through an oven 108. The oven 108 provides an elevated temperature for drying the solution. During drying, the solvent evaporates from the solution and the polymer remains on the substrate 78 to form a membrane. The substrate and membrane 110 are collected onto a storage roll 112 after leaving the oven 108.

The above first coating process results in a first membrane layer 66 being deposited on the substrate 78. To deposit the second membrane layer 68 on top of the first membrane layer 66, such as for the non-porous membrane example of FIG. 4, the storage roll 112 is removed and used as a feed roll 96 for a second coating process. In one preferred example, the second coating process is the same as the first coating process. Subsequent membrane layers may be deposited on top of the second membrane layer 68 as desired.

In one example, the first membrane layer 66 is deposited onto a polyvinylidene fluoride (PVDF) substrate 78 using the solvent casting machine 94 of FIG. 5.

The PVDF substrate 78 provides strength to and acts as a carrier for the non-porous membrane. The PVDF substrate 78 preferably has macropores 80 that have a diameter of approximately 0.1 micrometer or smaller and are generally about an order of magnitude or more larger in diameter than the micropores 72. The macropores 80 allow oxygen that has passed though the non-porous membrane to also pass through the PVDF substrate 78 to the non-fuel side 84 of the deoxygenator device 14.

The first membrane layer 66 is applied to the PVDF substrate 78 in the first coating process. The first coating process utilizes a solution that includes a fluoropolymer dissolved in a fluorosolvent. The fluoropolymer is preferably an amorphous glassy perfluorodioxole. The amorphous glassy perfluorodioxole copolymer has approximately 1wt % solubility in the fluorosolvent. One skilled in the art who has the benefit of this disclosure would recognize additional suitable polymers, fluoropolymers, and solvents that would be suitable for producing a non-porous membrane according to the invention.

The fluorosolvent preferably has a boiling point of approximately 80° C. The boiling point of the solvent used should be between about 60° C. and about 110° C. Use of a fluorosolvent with a boiling point at the lower end of this range yields processing advantages in that it takes less heat and/or less time to remove the solvent during the solution casting drying step. Use of a fluorosolvent with a boiling point at the upper end of the range requires higher drying temperatures and/or longer drying times to completely remove the solvent during drying.

In selecting the fluorosolvent, solubility of the fluoropolymer in the solvent should be considered. Generally, fluorosolvent with higher boiling points hold less fluoropolymer in solution while fluorosolvent with lower boiling points hold more fluoropolymer in solution. Several variables in the solution casting process, such as drying time, drying temperature, and membrane layer thickness, are affected by the amount of fluoropolymer dissolved in the fluorosolvent.

The first coating process is used to deposit the first membrane layer 66 and is followed by a first drying process in oven 108. In the first drying process, the temperature of the oven 108 is preferably maintained in the temperature range of about 130° C. to about 150° C. Drying at a temperature in the lower end of the range results in longer times to completely evaporate the solvent while using a temperature in the higher end of the range results in shorter times to completely evaporate the solvent. The first membrane layer 66 is preferably dried in the oven 108 for between 10 minutes and about 30 minutes. Preferably, the first membrane layer 66 is dried at a lower temperature in the temperature range and for a longer time in the time range to minimize the formation of defects. Use of these drying conditions with the amorphous glassy perfluorodioxole copolymer and fluorosolvent solution result in a first membrane layer 66 thickness of about 1 micrometer.

The PVDF substrate 78 is particularly well suited for carrying the first membrane layer 66 in the first coating process and first drying process. The PVDF substrate 78 is particularly compatible with the amorphous glassy perfluorodioxole copolymer material of the first membrane layer 66. As such, the first membrane layer 66 sufficiently bonds to the PVDF substrate 78 so as to prevent peeling of the first membrane layer 66 away from the PVDF substrate 78. Additionally, the PVDF substrate 78 can withstand the temperatures used to evaporate the solvent during the first drying process.

After drying the first membrane layer 66, the first membrane layer 66 and PVDF substrate 78 are collected on the storage roll 112. Referring back to FIG. 5, the storage roll 112 is then used as the feed roll 96 for application of a second membrane layer 68.

The second membrane layer 68 is applied in a second coating process using the solvent casting machine 94. Similar to the first coating process, the upper roller 100 deposits the solution. The solution is deposited on top of the first membrane layer 66 and is the same solution as is used for forming the first membrane layer 66 (i.e. amorphous glassy perfluorodioxole copolymer dissolved in fluorosolvent).

The second membrane layer 68 is preferably dried under similar conditions as are used for the first membrane layer 66 and results in a second membrane layer 68 thickness of about 1 micrometer. Selecting a lower temperature in the temperature range of about 130° C. to about 150° C. and a longer time in the time range of 10 minutes to about 30 minutes is preferable for producing the second membrane layer with a low amount of defects. One skilled in the art who has the benefit of this disclosure would recognize the benefit of producing additional membrane layers exceeding those illustrated in this example.

A third, forth, or even additional membrane layers may be produced in the same manner as the second membrane layer 68. One skilled in the art who has the benefit of this disclosure would recognize the benefit of producing additional or fewer membrane layers than illustrated in this example.

Figure 6:
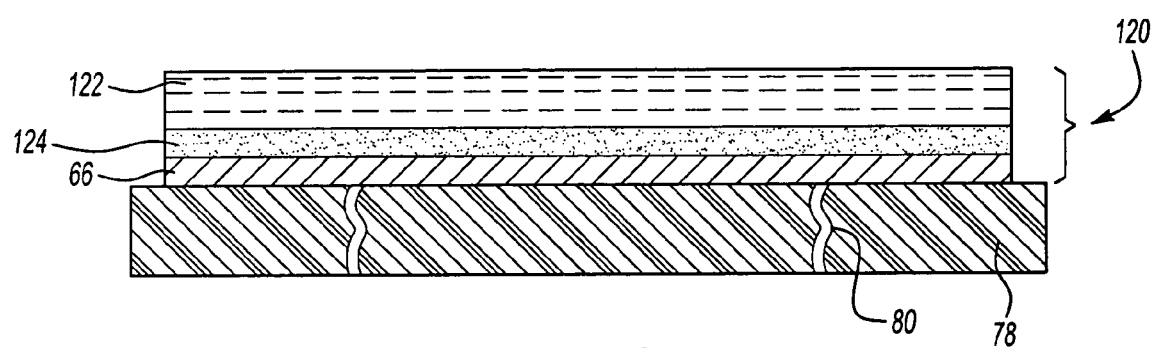
FIG. 6 is a schematic cross section of one example of a non-porous membrane before drying the second membrane layer.
Figure 7:
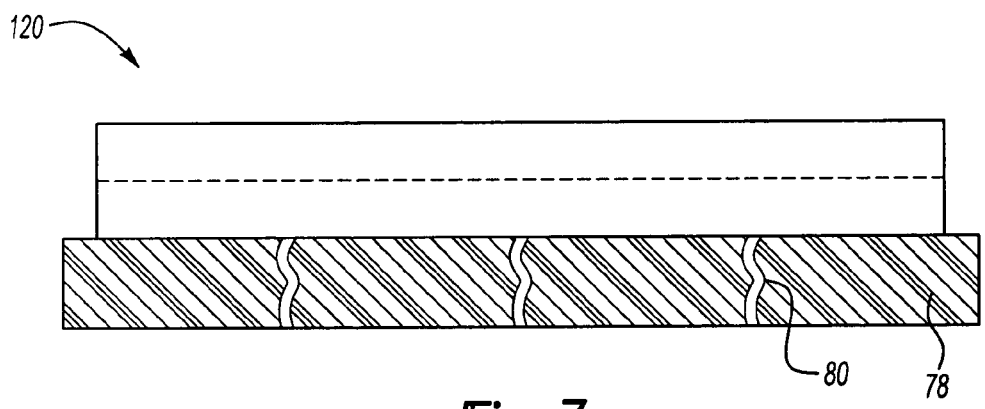
FIG. 7 is a schematic cross section of one example of a homogenous non-porous membrane produced according to the invention.

The example in FIG. 6 depicts a non-porous membrane 120 just after the application of solution that will form the second membrane layer 68. The solution 122 has been deposited by the upper roller 100 (referring back to FIG. 5) but has not yet been dried in the second drying process. During the time after deposit of the solution 122 and before the second drying process, the solution 122 dissolves a portion of the first membrane layer 66 to form a partially dissolved portion 124. The second drying process then removes the solvent from not only the solution 122 but also the partially dissolved portion 124. The result is the homogenous non-porous membrane 120 as illustrated in FIG. 7. The homogenous non-porous membrane 120 has no distinct layers because the layers were integrated by way of the partially dissolved portion 124.

The invention has been described in an illustrative manner, and it is to be understood that the terminology used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

We claim:
1. A method of manufacturing an aircraft fuel deoxygenator including a non-porous membrane, the method comprising the steps of:
    forming a first membrane layer in a first coating process by drying a first solution in a first drying process;
    forming a second membrane layer on top of the first membrane layer in a second coating process by drying a second solution in a second drying process, the second membrane layer and the first membrane layer form a non-porous membrane; and
    disposing said non-porous membrane in a fluid separating device, wherein said fluid separating device is a fuel deoxygenator of an aircraft.
2. The method as recited in claim 1, including the step of disposing the non-porous membrane on a substrate.
3. The method as recited in claim 1, including the step of forming a partially dissolved portion of the first membrane layer by partially dissolving the first membrane layer with the second solution so that the second membrane layer forms a single homogenous non-porous membrane with the first membrane layer after the second drying process.
4. The method as recited in claim 1, wherein the first solution comprises an amorphous glassy perfluorodioxole copolymer dissolved in a fluorosolvent that has a boiling point between 60° C. and 110° C.
5. The method as recited in claim 1, wherein the second solution comprises an amorphous glassy perfluorodioxole copolymer dissolved in a fluorosolvent that has a boiling point between about 60° C. and about 110° C.
6. The method as recited in claim 1, wherein said first drying process includes the step of heating to between about 130° C. and about 150° C. for between 10 minutes and about 30 minutes.
7. The method as recited in claim 1, wherein said second drying process includes the step of heating to between about 130° C. and about 150° C. for between 10 minutes and about 30 minutes.
8. The method as recited in claim 1, wherein said first coating process includes rolling said first solution onto said substrate.
9. The method as recited in claim 1, wherein said second coating process includes rolling said second solution on top of said first membrane layer after said first drying process.
10. The method as recited in claim 1, further comprising forming the first membrane layer with a thickness of about one micrometer and forming the second membrane layer with a thickness of about one micrometer.
11. The method as recited in claim 1, wherein the first drying process occurs before the second coating process.
12. The method as recited in claim 1, further comprising forming a seamless boundary between the first membrane layer having a thickness of about one micrometer and the second membrane layer having a thickness of about one micrometer.
13. The method as recited in claim 1, wherein the first solution and the second solution are equivalent to form the first membrane layer and the second membrane layer of a single type of polymer.

* * * * *